_United States Patent Office_

2,818,340
Patented Dec. 31, 1957

2,818,340

PROTECTING ANIMAL FOOD

Avery H. Goddin, Newark, and Silas S. Sharp, Marshallton, Del., assignors to E. I. du Pont de Nemours and Company, Wilmington, Del., a corporation of Delaware No Drawing. Application April 13, 1954
Serial No. 422,986

10 Claims. (Cl. 99—2)

This invention relates to processes for protecting stored materials against insect attack by covering the surface of the materials with a pulverulent, organophilic, inorganic solid and is more particularly directed to processes in which stored seeds, grains, tobacco, animal feeds and the like are protected against insect attack by coating them with particles of a pulverulent, inorganic solid having a chemically combined, organophilic surface.

Tremendous losses of foods, seeds, and tobacco are suffered on account of insect attacks on such materials in bulk storage. Fumigation can be employed in some circumstances to cut down the original insect infestation when the materials are placed in storage, but this control method is only temporary at best, and any surviving insects rapidly multiply, making repeated treatments necessary. Furthermore, for economical operation, fumigation must be carried out in gas-tight chambers, and such chambers are not universally available.

Accordingly, it has been recognized that there is a need for a method of insect-proofing stored materials by applying a protectant to the material itself. Since the products to be protected are generally destined for human or animal consumption, the common insecticides are not suitable because of their toxicity. However, even materials of low toxicity to humans cannot be used in foodstuffs if the proportion added is high enough that the protectant becomes also an adulterant. The problem, then, is to find a protectant which is not toxic to man or animals but has a higher order of toxicity to the insects to be controlled.

Numerous substances have been proposed to fulfill this requirement, but none have been fully successful. The substances which gave effective control of the insects were too toxic to man or animals, or imparted objectionable taste or color to foodstuffs, or in other ways degraded the quality of the material being protected, while substances which were not objectionable on these grounds had to be used in such a high proportion as to be uneconomic, or to interfere with milling, or even to be considered adulterants.

Now according to the present invention it has been found that pulverulent, inorganic substances which have a negligible toxicity to man and animals can be made highly effective as protectants for insect-consumable stored materials by chemically bonding to the surface of such substances an organophilic coating. The stored materials are coated with particles of the organophilic solid to make them resistant to insect attack. The organophilic solid can, for instance, be dusted onto the material to be protected during handling for other purposes, as when grain is being placed in an elevator.

The explanation for the protectant effect achieved according to the invention is not entirely clear. The protectant actually kills insects, but why this should be so is not at all obvious. Apparently the explanation is related to the organophilic surface of the pulverulent solid, since in many cases the solid without the organophilic surface is of a low order of effectiveness. But whether the organophilic coating acts by promoting contact between the solid and the insect, so that natural oils or fluids on the surface of the insect are adsorbed on the solid, followed by desiccation of the insect or whether it promotes ingestion of the protectant by the insect, or acts in some other way, is immaterial. Suffice it to say that, whatever the reason, the protective action is enhanced by the organophilic surface.

The materials protected by processes of the invention are insect-consumable. Obviously, there is no need to protect stored materials such as cement, which insects do not attack.

The materials are organic, rather than inorganic, and are consumable by man and animals in the sense that they are subject to the digestive processes. A principal class of such materials is stored grain, such as wheat, oats, rice, rye, barley, corn, and sorghum. Another class is stored seeds such as beans and peas. Animal feeds, such as alfalfa, timothy, and other forage grasses can also be protected. Tobacco, although it is not a food, is subject to being taken into the mouth and hence presents, in common with the other materials mentioned, a protection problem which is solved by the novel processes. Still another class of materials that can be protected includes fish meal and other animal foods.

A number of insect pests may be found in and feeding on stored grains. Among these are the granary and rice weevils, the lesser grain borer, the cadelle, Angumois grain-moth, the confused flour beetle, the saw-toothed grain beetle and many others. These insects are objectionable in grain, not only because of the actual physical loss resulting from their feeding, but also because the presence of insect refuse and fragments cause a down grading of the grain and ruin it for use in flour or cereal products. Against these and other insects the protectant processes of this invention are effective.

The protectants employed in processes of this invention are particulate, pulverulent solids having a chemically-combined, organophilic surface. For convenience of description, the solid particles without the surface-coating will hereinafter be called the "substrate," and the chemically-combined surface coating will be called the "surface."

While various naturally-occurring inorganic solids, such as bentonitic and attapulgite clays, chalk, talc and the like, are readily obtainable as powders of the type above-described, various artificially-prepared inorganic solids are especially suitable as substrates. The preferred substances of this type are siliceous—that is they contain silicon dioxide, either alone or in combination with such metal oxides as those of iron, aluminum, sodium, potassium, and magnesium. For instance, metal silicates, which are combined oxides of silicon and other metal oxides, are members of this class.

The art is already familiar with various ways of preparing inorganic solids in finely divided, or pulverulent form, and only a few of these will be mentioned as illustrative but it will be understood that other products of this type are also well known and can be used.

In United States Patent 2,657,149, issued October 27, 1953, to R. K. Iler there is described a wide range of siliceous materials, and any of these materials can be employed as the substrate of a protectant of the present invention. In particular, the preferred silica substances of that patent are especially suitable. Such substrates have a specific surface area of from 1 to 900 m.²/g., broadly, and more specifically from 25 to 900 m.²/g. or narrowly, 200 to 600 m.²/g. They can advantageously be in the form of aggregates of coherent, ultimate, non-porous spherical units of average diameter in the range of 5 to 100 millimicrons, and the aggregates can have an average pore diameter of at least 4 millimicrons. The ultimate units in the aggregates can be so open-packed that the oil absorption in milliliters per 100 grams of solid is from 1 to 3 times the specific surface area in square meters per gram, and the aggregates can be reinforced with accreted silica to such an extent that the coalescence factor is from 30 to 80% as determined from the depolymerization rate, all as more fully described in an application of Alexander, Iler, and Wolter, Serial No. 244,722, filed August 31, 1951, now Patent No. 2,731,326.

Suitable silica substrates may also be prepared by thermal methods known to the art, as by burning ethyl silicate in air or silicon tetrachloride in the presence of hydrogen. Various other methods of preparing suitable substrates will readily be apparent to those skilled in the art, in view of the foregoing disclosure.

To make a protectant for use according to this invention from a substrate as just described, the surface must be rendered organophilic. It will be understood that the surface may be hydrophobic as well as organophilic—that is, it may not only prefer to be wet by organic liquids in preference to water, but it may also actually resist wetting by water; however, organophilic character is the minimum condition. An organophilic substance prefers to be wet by butanol in a butanol-water mixture, a precise test for organophilic surface being as follows:

The powder is slurried at least twice with an excess of warm methyl ethyl ketone and filtered, to remove any organic liquid not chemically reacted with the surface. It is then dried at 75° C. in a vacuum oven for about 24 hours. The dry powder is passed through a 200 mesh screen. A ¼ cc. sample of the powder is added to 10 cc. of distilled water at room temperature in a 30 cc., 6 in. long test tube. The tube is stoppered and given about five vigorous vertical shakes. The material which has not wetted into the water (e. g., is floating on the surface) and does not wet into the water after standing for 15 minutes, is considered to be hydrophobic. Then 10 cc. of normal butanol is added to the test tube, and it is again stoppered and given five vigorous vertical shakes. It will be seen that the butanol forms of separate layer which floats on the water. The material which rises above the interface and passes into suspension in the butanol layer upon gentle stirring is considered organophilic according to this test. (If an emulsion results upon shaking, it may be broken by gentle agitation with a glass stirring rod or by allowing the mixture to stand for as much as one-half hour, if necessary, to complete the test. All of the protectants used according to this invention are organophilic according to this test, and the preferred protectants are also hydrophobic.)

The art is also familiar with methods for applying organophilic and/or hydrophobic coatings to inorganic substrates. Generally, such methods consist in effecting contact between the substrate and an agent capable of reacting with negative groups, especially hydroxyl groups, on the surface of the substrates. The esterification method of the above-mentioned U. S. Patent 2,657,149 is a preferred way of organophilizing siliceous substrates. The products obtained have a surface of silica with —OR groups chemically bound thereto, R being a hydrocarbon radical of from 2 to 18 carbon atoms in which the carbon atom attached to oxygen is also attached to hydrogen. In particularly preferred products there are at least 100 —OR groups per 100 square millimicrons of substrate surface area, and also the hydrocarbon radical contains from 3 to 6 carbon atoms, especially 4.

Other organophilic, inorganic, finely-divided solids which can be used as protectants are products prepared by treating suitable substrates with organohalosilanes. Such a method is described by Safford, in U. S. Patent 2,510,661, and by Kistler, in U. S. Patent 2,589,705, whereby an organophilic coating (which is also hydrophobic) is applied by contacting the substrate with, for instance, a gaseous mixture of dimethyldichlorosilane and trimethylchlorosilane.

Still other treatments for imparting organophilic coatings are described by Sirianni and Puddington in United States Patent 2,583,604, 5 and 6. The coatings described are organosiloxane polymers, linseed oil-modified alkyd resins, or polymerized aminosilanes. Other surface-organophilizing treatments will be readily apparent to those skilled in the art in view of the foregoing disclosure.

Having selected a suitable protectant as above-described, a process of this invention is carried out by coating therewith the insect-consumable material which is to be stored. In most instances such material is dry vegatable matter for which techniques of handling are well known, and the coating processes of this invention can be integrated into the handling operations. For instance, the organophilic protectant can be fed as a dust to grain while on the conveyor customarily used to move the grain into storage bins, or alternatively, it can be fed to the grain as it passes into freight cars of ships' holds for movement to the elevator. Similarly, the protectant can be dusted onto tobacco as it is being hung in the curing sheds.

Dusting is ordinarily the most economic way to apply the protectant. Any of the various well known techniques of dusting can be used. If the protectant is not in powdered form, but is pulverulent and easily reducible to a powder, the method of application should provide sufficient attrition to break the material down into a powder of sufficient fineness so that when thoroughly mixed with or coated upon the material to be protected it is not discernible to the eye.

The rate of application of the protectant is dependent on relation of the surface area of the insect-consumable material to its density. For instance, for beans and grain having about the same density, the weight of protectant needed per pound of wheat will be larger because the grain has more surface to protect per unit weight. For a preferred protectant such as the estersils of United States Patent 2,657,149, the amount used for protection of grain is from 250 to 5000 parts per million, with 500 to 2000 p. p. m. being preferred. For other insect-consumable materials the amount of protectant can be more or can be less, as above-indicated. The amounts of less effective protectants to use are higher than this range.

The protected, insect-consumable products of this invention are substantially unchanged in their suitability for their intended use. The protectant coating is not visible to the unaided eye. It does not interfere with the milling of grains to make flour, nor with the germination of seeds, nor with the edibility of foodstuffs.

The invention will be better understood by reference to the following illustrative examples, in addition to those already given.

*Example 1*

An organophilic silica, 100% esterified with butanol by a method of U. S. Patent 2,657,149, and having an aggregate particle size of 1 to 100 millimicrons and a surface area of approximately 135 to 160 sq. meters per gram was mixed with wheat at rates of 20 to 120 mg./100 g. of wheat by vigorously shaking with wheat samples in glass jars. To these jars were added 50 specimens each of additional lesser grain borers and granary weevils. The wheat was then held at 80° F. for a period of 3 to 12 weeks. The approximate percentage of wheat destroyed by insects in the treated samples compared to an untreated check is given below.

| Material | Approximate percent of wheat destroyed in 12 weeks by insects at various dosage rates of organophilic silica | | | | | |
|---|---|---|---|---|---|---|
| | Mg. dust per 100 gms. of wheat | | | | | |
| | 20 | 40 | 80 | 120 | 160 | 200 |
| Organophilic silica | 19 | 3 | .1 | 0 | | |
| Silica substrate (hydrophilic) | | | 18 | 15 | 11 | 5 |
| Untreated wheat | Ave. 70% in 12 weeks | | | | | |

*Example 2*

Comparison of the action of another organophilic silica, prepared in accordance with a process of U. S. Patent 2,657,149 and having a surface area of 300 m.²/g., and two nonorganophilic siliceous materials, is given below. "HiSil" is a precipitated hydrated silica containing about 2–3% calcium having an ultimate particle size of 5 microns and a surface area of approximately 86 sq. meters per gram. "Santocel ARD" is a nonorganophilic silica.

The wheat was coated with protectant as described in Example 1.

| Silica | Weight of wheat after test [1] | | | | cc. of Insects [2] | | | |
|---|---|---|---|---|---|---|---|---|
| | 25 mg.[3] | 50 mg.[3] | 100 mg.[3] | 200 mg.[3] | 25 mg.[3] | 50 mg.[3] | 100 mg.[3] | 200 mg.[3] |
| Organophilic Silica | 82 | 96 | 98 | 98 | 3.1 | 0.9 | 0.7 | 0.7 |
| Hi Sil | 76 | 85 | 89 | 93 | 3.6 | 3.5 | 2.5 | 2.0 |
| Santocel ARD | 74 | 84 | 89 | 94 | 4.0 | 3.0 | 2.4 | 1.7 |
| Untreated | 73 | 68 | 69 | 70 | 3.7 | 5.7 | 4.1 | 3.9 |

[1] Weight to the nearest gram.
[2] Volume of insects recovered by screens. 50 granary weevils plus 50 lesser grain borers, the starting infestation, measure about 0.25 cc. when alive and about 0.7 cc. when dead.
[3] Mg. of dust per 102 g. wheat containing 12% moisture when the test started. By the end of the test, uninfested wheat weighed 98 g., a moisture loss of 4%.

*Example 3*

A further test was carried out on an organophilic silica of the type of that used Example 2 to demonstrate more particularly the results in the lower range of proportion of protectant. For comparison, the corresponding results on the silica substrate, without the organophilic coating are given. The protectant was applied to wheat as described in Example 1.

Also, an organophilic silica, made organophilic by a surface coating of trimethylsilyl groups, was tested, and the results are given.

| Silica | Approx. Percent by Weight of Wheat Destroyed | | | | | | |
|---|---|---|---|---|---|---|---|
| | Dosage—Mg. Dust per 102 g. Wheat | | | | | | |
| | 20 | 40 | 60 | 80 | 100 | 120 | 160 |
| Untreated Silica Substrate | 38 | 22 | 27 | 10 | | | |
| Organophilic Silica of Example 2 | 32 | 11 | 2 | 3 | 1 | 1 | 1 |
| Organosilyl-Coated Silica | | | 22 | 4 | | 1 | 0 |

*Example 4*

The performance of certain dry, organophilic powders on three species of insects which commonly attack stored materials is shown below.

| Treatment | Dose, Mg. | 20 Granary weevil adults per 4″ dish, open | | | 20 German cockroach nymphs [4] per 4″ dish, open | | | | | 10 Southern armyworm larvae [5] per closed 4″ dish | | |
|---|---|---|---|---|---|---|---|---|---|---|---|---|
| | | Percent Affected [1] | | Percent Dead+ M [2] | Percent Affected [1] | Percent D + M [2] | | Percent Dead | | Percent Affected [1] | Percent d + M [2] | Percent Dead |
| | | 1 hr. | 2 hr. | 20 hr. | 2 hr. | 3 hr. | 4 hr. | 8 hr. | 24 hr. | 4 hr. | 24 hr. | 48 hr. |
| Organophilic Silica of Example 2 | 5 | 20 | 90 | 100 | 10 | 95 | 100 | 100 | 100 | 10 | 60 | 100 |
| Hydrophobic magnesium silicate [3] | 5 | 0 | 85 | 95 | 15 | 30 | 60 | 100 | 100 | 10 | 70 | 100 |
| Untreated | 0 | 0 | 5 | 0 | 0 | 0 | 0 | 0 | 0 | 0 | 0 | 20 |
| Organophilic Silica of Example 2 | 10 | 45 | 100 | 100 | 50 | 95 | 100 | 100 | 100 | 30 | 90 | 100 |
| Hydrophobic magnesium silicate [3] | 10 | 0 | 85 | 100 | 10 | 30 | 100 | 100 | 100 | 10 | 70 | 100 |

[1] Affected insects—not moving in normal manner.
[2] M–moribund, insects so greatly affected that they are judged to be dying.
[3] Hydrophobic, with a surface area of approximately 300 M²/g. and a density of 0.10 g./ml. under a load of 3 p. s. i.
[4] Size passing USS Sieve Series Screen #7 and holding on #10.
[5] Size of 0.75 to 1.0 inch in length.
Note.—Dosage transferred to dish, dish shaken sideways to distribute dose, all insects emptied from an untreated to the treated dish, dish shaken sideways again, and insects observed at various intervals. Tests conducted at T=80° F. and R. H.=55%.

We claim:

1. In a process for protecting an animal food against insect attack in storage the step comprising coating the surface of said food with a pulverulent, organophilic siliceous solid.

2. In a process for protecting an animal food against insect attack in storage the step comprising coating the surface of said food with a pulverulent, hydrophobic, siliceous solid.

3. In a process for protecting an animal food against insect attack in storage the step comprising coating the surface of said food with an estersil, the estersil being organophilic in that it is preferentially wetted by butanol in a butanol-water mixture and comprising a supercolloidal substrate coated with —OR groups, the substrate having a surface of silica and having a specific surface area of from 1 to 900 square meters per gram, the coating of —OR groups being chemically bound to said silica, and R being a hydrocarbon radical of from 2 to 18 carbon atoms wherein the carbon atom attached to oxygen is also attached to hydrogen.

4. In a process for protecting an animal food against insect attack in storage the step comprising coating the surface of said food with a pulverulent, organophilic siliceous solid having a surface of organosilyl groups.

5. In a process for protecting stored grain against insect attack the step comprising coating the surface of the grain with a hydrophobic estersil comprising a supercolloidal substrate coated with —OR groups, the substrate having a surface of silica and having a specific surface area of from 1 to 900 square meters per gram, the coating of —OR groups being chemically bound to said silica, and R being a hydrocarbon radical of from 2 to 18 carbon atoms wherein the carbon atom attached to oxygen is also attached to hydrogen.

6. A composition comprising an animal food surface-coated with a pulverulent, organophilic, siliceous solid.

7. A composition comprising an animal food surface-coated with a pulverulent, hydrophobic, siliceous solid.

8. A composition comprising an animal food surface-coated with an estersil, the estersil being organophilic in that it is preferentially wetted by butanol in a butanol-water mixture and comprising a supercolloidal substrate coated with —OR groups, the substrate having a surface of silica and having a specific surface area of from 1 to 900 square meters per gram, the coating of —OR groups being chemically bound to said silica, and R being a hydrocarbon radical of from 2 to 18 carbon atoms wherein the carbon atom attached to oxygen is also attached to hydrogen.

9. A composition comprising an animal food surface-coated with a pulverulent, organophilic, siliceous solid having a surface of organosilyl groups.

10. Grain surface-coated with a hydrophobic estersil comprising a supercolloidal substrate coated with —OR groups, the substrate having a surface of silica and having a specific surface area of from 1 to 900 square meters per gram, the coating of —OR groups being chemically bound to said silica, and R being a hydrocarbon radical of from 2 to 18 carbon atoms wherein the carbon atom attached to oxygen is also attached to hydrogen.

References Cited in the file of this patent

UNITED STATES PATENTS

| | | |
|---|---|---|
| 2,510,661 | Safford | June 6, 1950 |
| 2,657,149 | Iler | Oct. 27, 1953 |

OTHER REFERENCES

Brown: Insect Control by Chemicals, John Wiley & Sons., New York, N. Y., 1951, page 707.